US012142289B2

(12) United States Patent
Kim et al.

(10) Patent No.: US 12,142,289 B2
(45) Date of Patent: Nov. 12, 2024

(54) ADAPTIVE ECHO DELAY DETERMINATION USING AN OUT-OF-BAND ACOUSTIC REFERENCE SIGNAL

(71) Applicant: Motorola Mobility LLC, Chicago, IL (US)

(72) Inventors: Seungho Kim, Vernon Hills, IL (US); Joseph C. Dwyer, Downers Grove, IL (US); Giles T. Davis, Downers Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/592,023

(22) Filed: Feb. 3, 2022

(65) Prior Publication Data

US 2023/0245669 A1 Aug. 3, 2023

(51) Int. Cl.
*G10L 21/0224* (2013.01)
*G10L 19/018* (2013.01)
*G10L 21/0208* (2013.01)

(52) U.S. Cl.
CPC ........ *G10L 21/0224* (2013.01); *G10L 19/018* (2013.01); *G10L 2021/02082* (2013.01)

(58) Field of Classification Search
CPC ............... G10L 21/0224; G10L 19/018; G10L 2021/02082
USPC .......................................................... 704/267
See application file for complete search history.

(56) References Cited

U.S. PATENT DOCUMENTS 6,510,225 B1 1/2003 Robertson et al.
9,319,633 B1 4/2016 Birkenes et al.
9,319,816 B1 4/2016 Narayanan
2008/0043998 A1* 2/2008 Ulmer ..................... H04M 9/00 379/402
2013/0129102 A1 5/2013 Li et al.
2013/0268277 A1* 10/2013 Duplan .................... H04B 7/00 704/500
2014/0140503 A1* 5/2014 Duplan .................... H04K 1/02 308/35
2014/0307590 A1* 10/2014 Dobbelaere ........... H04M 3/658 370/260
2016/0379617 A1* 12/2016 Villaume ............. G10K 11/178
2017/0093460 A1 3/2017 Zargar et al.
2023/0003880 A1* 1/2023 Ding ....................... G01S 15/04

* cited by examiner

*Primary Examiner* — Richemond Dorvil
*Assistant Examiner* — Ethan Daniel Kim
(74) *Attorney, Agent, or Firm* — FIG. 1 Patents

(57) ABSTRACT

An adaptive echo cancellation system introduces an acoustic reference signal to audio content being transmitted to the speaker for playback. The acoustic reference signal is an out-of-band signal, such as an ultrasonic signal, which is typically not audible to humans. The microphone of the mobile device receives the audio content played back by the speaker as well as audio content introduced by the user (e.g., the speech of the user). The adaptive echo cancellation system detects the acoustic reference signal and determines a time delay between when the acoustic reference signal was introduced to the audio content and when the audio content including the acoustic reference signal was received by the mobile device. Echo is cancelled from the received audio content based on this determined time delay.

20 Claims, 9 Drawing Sheets

ADAPTIVE ECHO DELAY DETERMINATION USING AN OUT-OF-BAND ACOUSTIC REFERENCE SIGNAL

BACKGROUND

As technology has advanced our uses for mobile computing devices have expanded. One such use is video or voice calls where two or more users are able to talk to one another, and optionally see one another, using their mobile devices. One issue with such video or voice calls is that when audio from the other side of a call is played back on a mobile device, the audio is also picked up by a microphone of the mobile device, introducing an echo into the audio communicated back to the other side of the call. One solution is to perform echo cancellation to reduce this echo. However, conventional echo cancellation relies on knowing the distance between the microphone and the speaker. In situations where the distance between the microphone and the speaker is not known results in poor echo cancellation being performed, a frustrating problem for users that can lead to user frustration with their devices and video or voice calling applications.

BRIEF DESCRIPTION OF THE DRAWINGS

Embodiments of adaptive echo delay determination using an out-of-band acoustic reference signal are described with reference to the following drawings. The same numbers are used throughout the drawings to reference like features and components.

DETAILED DESCRIPTION

Figure 1:
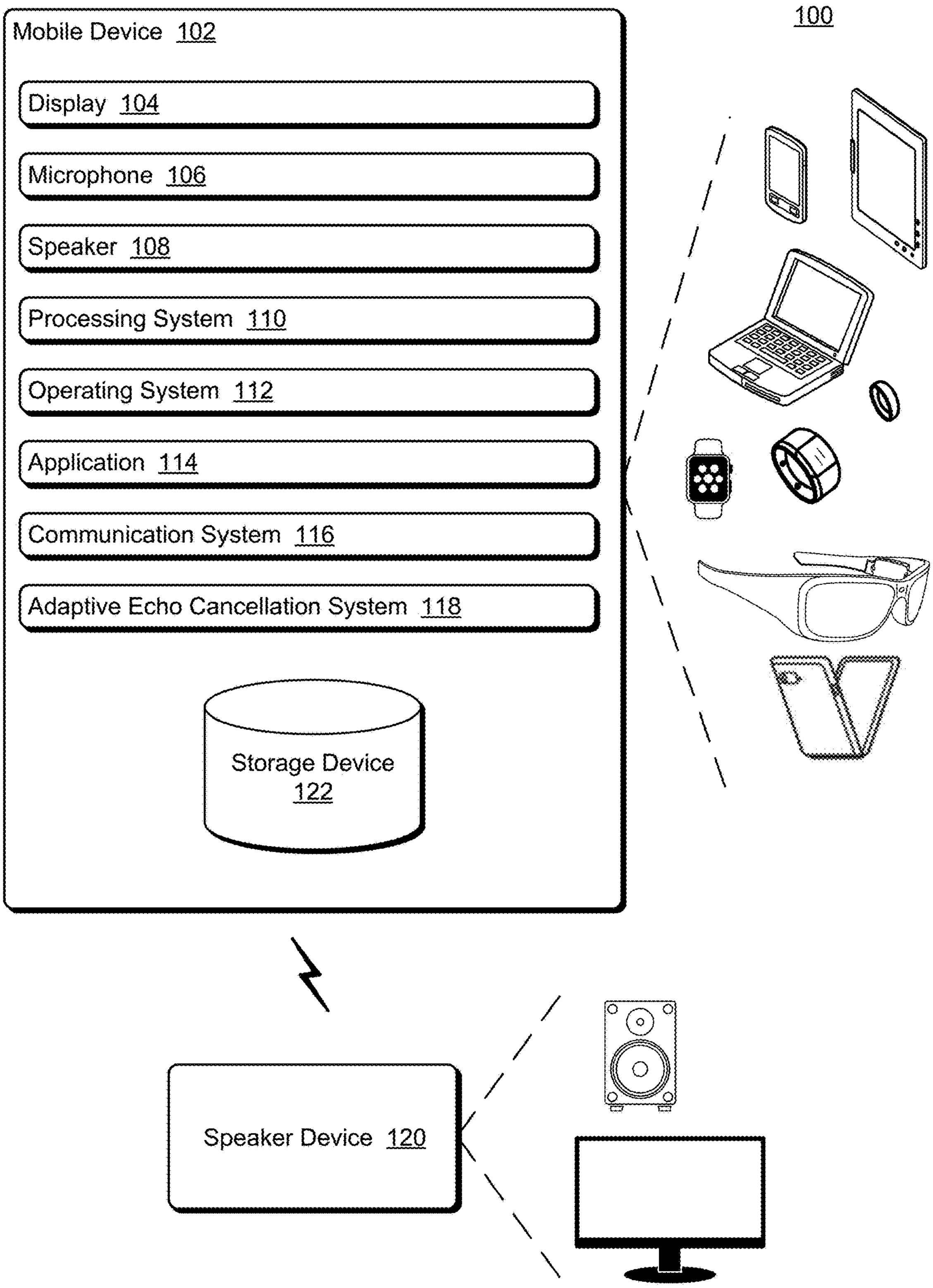
FIG. 1 illustrates an example system including a mobile device implementing the techniques discussed herein.

Adaptive echo delay determination using an out-of-band acoustic reference signal is discussed herein. Echo cancellation systems use an echo delay to cancel echo from audio, which is the amount of time between the audio being played back (or sent to a speaker device for playback) and a time at which the audio is subsequently received by a microphone. Traditional echo cancellation systems rely on a known distance between the speaker device and the microphone (and the speed of sound) to determine the echo delay. However, such echo cancellation systems generate poor results in situations where the distance between the speaker device and the microphone is not known or changes.

In contrast, the techniques discussed herein provide an adaptive echo cancellation system that automatically adapts to the distance between a microphone of a mobile device and a speaker (an audio playback device). Accordingly, in situations in which the distance between the microphone and the speaker are not known, or changes (e.g., during a voice or video call), the adaptive echo cancellation system automatically adapts to the distance to provide accurate echo cancellation.

More specifically, the adaptive echo cancellation system introduces an acoustic reference signal to audio content being transmitted to the speaker for playback. The acoustic reference signal is an out-of-band signal, such as an ultrasonic signal, which is typically not audible to humans. The microphone of the mobile device receives the audio content played back by the speaker as well as audio content introduced by the user (e.g., the speech of the user). The adaptive echo cancellation system detects the acoustic reference signal and determines a time delay between when the acoustic reference signal was introduced to the audio content and when the audio content including the acoustic reference signal was received by the mobile device. An echo cancelling module cancels the echo from the received audio content based on this determined time delay.

The techniques discussed herein improve the operation of a mobile device by not requiring the distance between a speaker (an audio playback device) and the microphone of the mobile device to be known in order to perform echo cancellation. Rather, the adaptive echo cancellation system automatically adapts to the distance between the speaker and the microphone. This supports various usage scenarios. For example, a user may be in a voice or video call and cast the audio to an external speaker device, such as a television. The adaptive echo cancellation system automatically adapts the echo cancellation to account for the distance between the external speaker device and the microphone. Furthermore, if the user moves during the voice or video call and changes the distance between the television and the microphone, the adaptive echo cancellation system automatically adapts the echo cancellation to account for such changes.

The techniques discussed herein also improve the operation of a mobile device in situations where the speaker and microphone are part of the same device. For example, a flip phone may include a speaker on one part of the phone and a microphone on another part of the phone. The phone may be opened to various different positions so the distance between the microphone and the speaker may not be known at any given time. Nonetheless, the techniques discussed herein allow the adaptive echo cancellation system to automatically adapt to the distance between the speaker and the microphone to perform echo cancellation.

The techniques discussed herein further improve the operation of a mobile device by automatically accounting for unknown delays introduced by external devices. For example, a user may be in a voice or video call and cast the audio to an external speaker device, such as a smart television. The smart television may introduce a delay of a couple seconds after receiving the audio (and optionally video). Such a delay will result in a delay of the acoustic reference signal, allowing the adaptive echo cancellation system to automatically adapt to the delay.

FIG. 1 illustrates an example system 100 including a mobile device 102 implementing the techniques discussed herein. The mobile device 102 can be, or include, many different types of mobile, computing, or electronic devices.

For example, the mobile device 102 can be a smartphone or other wireless phone, a notebook computer (e.g., netbook or ultrabook), a laptop computer, a foldable or rollable device, a wearable device (e.g., a smartwatch, a ring or other jewelry, augmented reality headsets or glasses, virtual reality headsets or glasses), a tablet or phablet computer, an entertainment device (e.g., a gaming console, a portable gaming device, a streaming media player, a digital video recorder, a music or other audio playback device), an Internet of Things (IoT) device, and so forth.

The mobile device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth.

Although illustrated as part of the mobile device 102, it should be noted that one or more of the display 104, the microphone 106, and the speaker 108 can be implemented separately from the mobile device 102. In such situations, the mobile device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the mobile device 102 and the mobile device 102 (e.g., a streaming media player) communicates with the display 104 via an HDMI cable. By way of another example, the microphone 106 may be separate from the mobile device 102 (e.g., the mobile device 102 may be a television and the microphone 106 may be implemented in a remote control device) and voice inputs received by the microphone 106 are communicated to the mobile device 102 via an IR or radio frequency wireless connection.

The mobile device 102 also includes a processing system 110 that includes one or more processors, each of which can include one or more cores. The processing system 110 is coupled with, and may implement functionalities of, any other components or modules of the mobile device 102 that are described herein. In one or more embodiments, the processing system 110 includes a single processor having a single core. Alternatively, the processing system 110 includes a single processor having multiple cores or multiple processors (each having one or more cores).

The mobile device 102 also includes an operating system 112. The operating system 112 manages hardware, software, and firmware resources in the mobile device 102. The operating system 112 manages one or more applications 114 running on the mobile device 102 and operates as an interface between applications 114 and hardware components of the mobile device 102.

The mobile device 102 also includes a communication system 116. The communication system 116 manages communication with various other devices, such as by establishing voice calls or video calls (including audio and video) with other devices. These voice or video calls are managed by an application 114 or the operating system 112.

The mobile device 102 also includes an adaptive echo cancellation system 118. The adaptive echo cancellation system 118 automatically adapts to the distance between a microphone of a mobile device and a speaker (an audio playback device), and to any delays that may be introduced by the speaker, to perform echo cancellation. The speaker may be an internal speaker of the mobile device 102 (e.g., the speaker 108) or an external speaker device such as the external speaker device 120. The mobile device 102 can communicate with the speaker 108 via any of a variety of wired (e.g., USB, IEEE 1394, HDMI) or wireless (e.g., Wi-Fi, Bluetooth, infrared (IR)) connections.

The external speaker device 120 is any of a variety of different devices that include a speaker and, analogous to the speaker 108, can be configured as any suitable type of speaker incorporating a transducer that converts an electrical signal into sound, such as a dynamic loudspeaker using a diaphragm, a piezoelectric speaker, non-diaphragm based speakers, and so forth. The speaker 108 may be a standalone speaker such as a bookshelf speaker, a speaker incorporated into another device such as a smart television, and so forth.

The adaptive echo cancellation system 118 can be implemented in a variety of different manners. For example, the adaptive echo cancellation system 118 can be implemented as multiple instructions stored on computer-readable storage media and that can be executed by the processing system 110. Additionally or alternatively, the adaptive echo cancellation system 118 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The mobile device 102 also includes a storage device 122. The storage device 122 can be implemented using any of a variety of storage technologies, such as magnetic disk, optical disc, Flash or other solid state memory, and so forth. The storage device 122 can store various program instructions and data for any one or more of the operating system 112, application 114, and the adaptive echo cancellation system 118.

Figure 2:
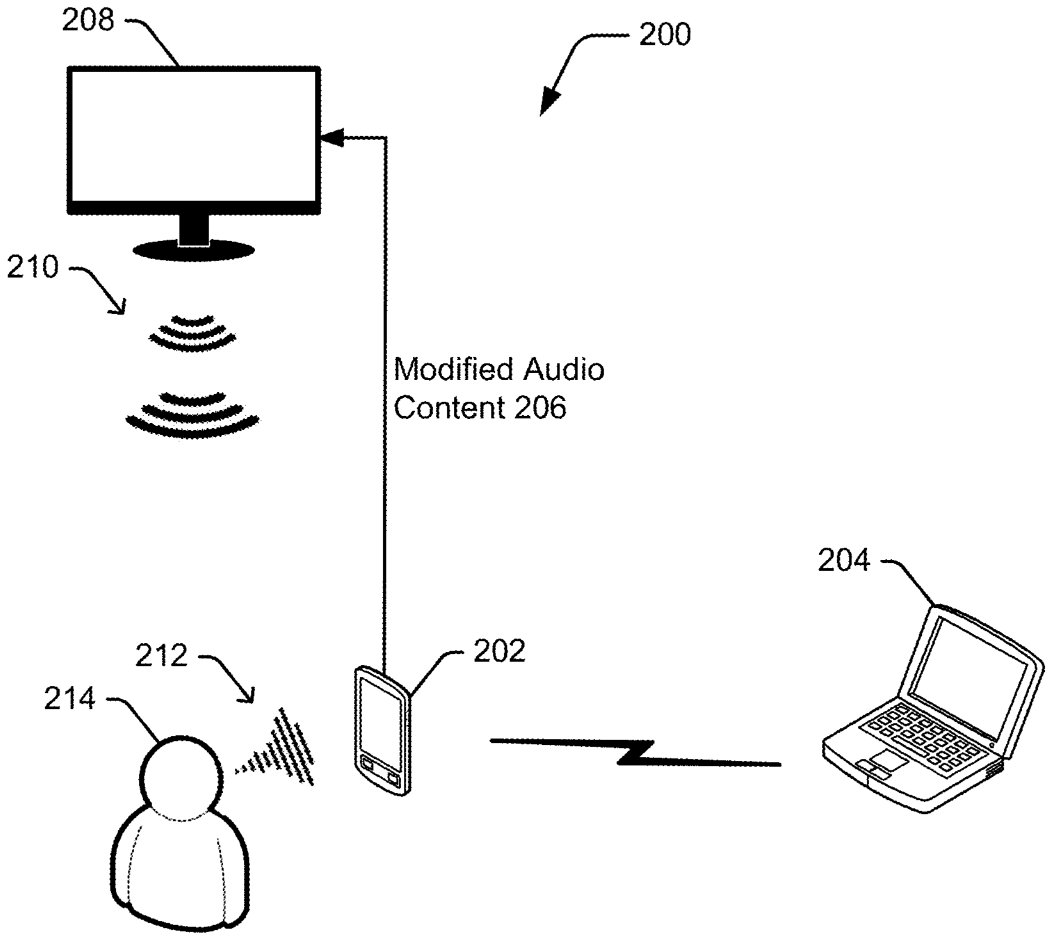
FIG. 2 illustrates an example of using the techniques discussed herein.

FIG. 2 illustrates an example 200 of using the techniques discussed herein. The example 200 includes a mobile device 202 communicating with a remote device 204, for example in a voice or video call. The remote device 204 can be any distance away, such as hundreds or thousands of miles. Communication between the mobile device 202 and the remote device 204 can be carried out over a network, which can be any of a variety of different networks such as the Internet, a local area network (LAN), a public telephone network, a cellular network (e.g., a third generation (3G) network, a fourth generation (4G) network, a fifth generation (5G) network), an intranet, other public or proprietary networks, combinations thereof, and so forth.

The mobile device 202 receives audio content from the remote device 204 and adds an out-of-band acoustic reference signal to the audio content. This audio content with the out-of-band acoustic reference signal is transmitted to an external speaker device 208 as modified audio content 206. The external speaker device 208 outputs the modified audio content 206 as audio playback 210, which is received (e.g., picked up or sensed) by a microphone in the mobile device 202 as audio input. Speech 212 from a user 214 of the mobile device 202 is also received by the microphone in the mobile device 202 as audio input.

The external speaker device 208 is typically local to the mobile device 202 so that the user 214 is able to hear the audio playback 210. However, the external speaker device 208 may be any of a range of distances away from the mobile device 202, for example anywhere from 2 feet to 20 feet or further away. The out-of-band acoustic reference signal included in the modified audio content 206 allows the mobile device 202 to determine an echo delay based on the distance between the mobile device 202 and the external speaker device 208. Using this echo delay, the mobile device 202 performs echo cancellation so that speech 212 from the user 214 is transmitted to the remote device 204 but the audio playback 210 received by the microphone of the mobile device 202 is not transmitted to the remote device 204.

Figure 3:
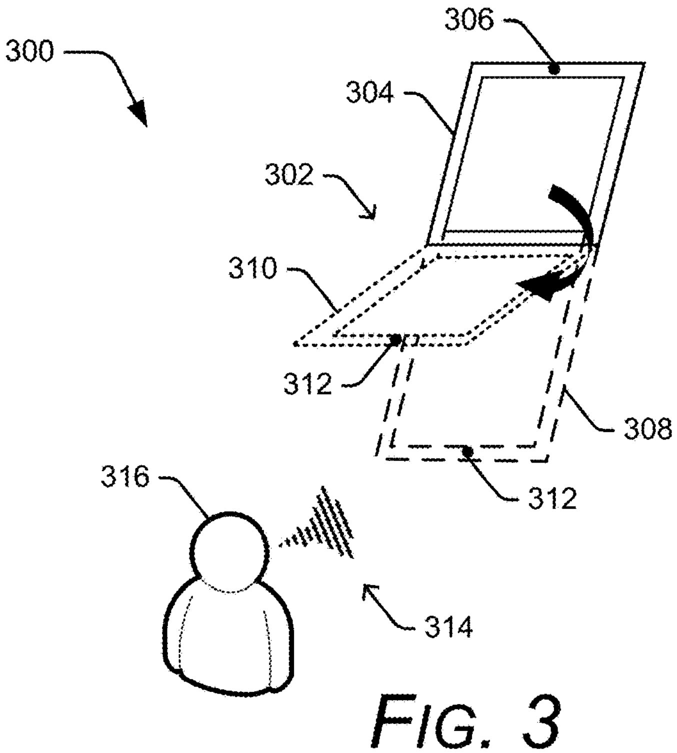
FIG. 3 illustrates another example of using the techniques discussed herein.

FIG. 3 illustrates another example 300 of using the techniques discussed herein. The example 300 includes a mobile device 302 that is a flip phone having one part 304 with a speaker 306 and a second part (illustrated as part 308 at one position and part 310 at another position) with a microphone 312. The two parts are connected to one another by a mechanism (e.g., a hinge mechanism) that allows the parts to move towards one another or away from one another.

The mobile device 302 receives audio content from a remote device (e.g., analogous to the remote device 204 of FIG. 2) and modifies the audio content by adding an out-of-band acoustic reference signal to the audio content. The speaker 306 outputs the modified audio content, which is received (e.g., picked up or sensed) by the microphone 312 as audio input. Speech 314 from a user 316 of the mobile device 302 is also received by the microphone 312 as audio input.

Given the movable nature of the two parts of the mobile device 302 relative to one another, the speaker 306 may be any of a range of distances away from the microphone 312. For example, the speaker 306 may be 5 inches away from the microphone 312 when the second part is in one position (e.g., illustrated as part 308) and 6 inches away from the microphone when the second part is in another position (e.g., illustrated as part 308). The out-of-band acoustic reference signal included in the modified audio content allows the mobile device 302 to determine an echo delay based on the distance between the speaker 306 and the microphone 312. Using this echo delay, the mobile device 302 performs echo cancellation so that speech 314 from the user 316 is transmitted to the remote device but the modified audio content played back by the speaker 306 is not transmitted to the remote device.

Figure 4:
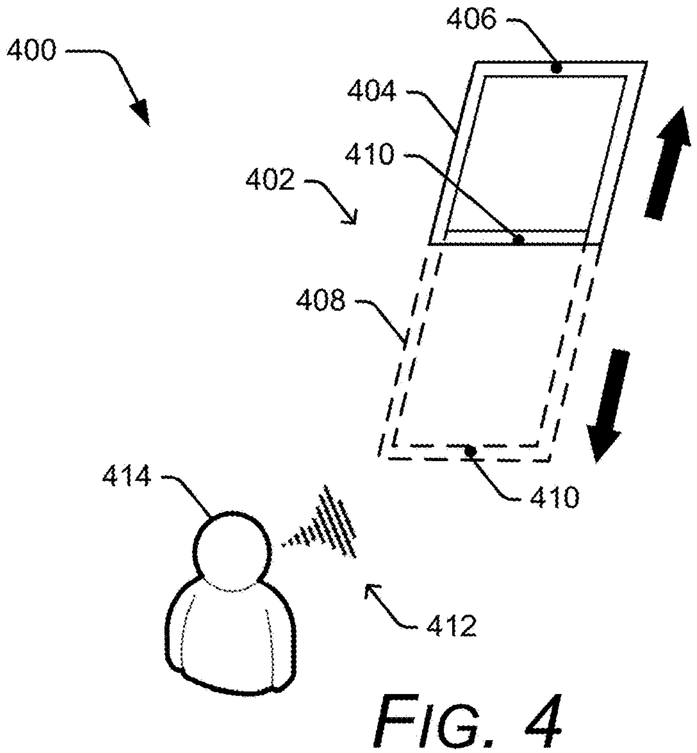
FIG. 4 illustrates another example of using the techniques discussed herein.

FIG. 4 illustrates another example 400 of using the techniques discussed herein. The example 400 includes a mobile device 402 that is a slide phone having one part 404 with a speaker 406 and a second part 408 with a microphone 410. The two parts are connected to one another by a mechanism that allows the parts to move towards one another or away from one another in a sliding manner.

The mobile device 402 receives audio content from a remote device (e.g., analogous to the remote device 204 of FIG. 2) and modifies the audio content by adding an out-of-band acoustic reference signal to the audio content. The speaker 406 outputs the modified audio content, which is received (e.g., picked up or sensed) by the microphone 410 as audio input. Speech 412 from a user 414 of the mobile device 402 is also received by the microphone 410 as audio input.

Given the movable nature of the two parts of the mobile device 402 relative to one another, the speaker 406 may be any of a range of distances away from the microphone 410. For example, the speaker 406 may be 3 inches away from the microphone 410 when the second part is in one position (e.g., when the two parts are moved close together, such as part 408 is retracted within or below part 404) and 6 inches away from the microphone when the second part is in another position (e.g., the part 408 is fully extended out from the first part 404). The out-of-band acoustic reference signal included in the modified audio content allows the mobile device 402 to determine an echo delay based on the distance between the speaker 406 and the microphone 410. Using this echo delay, the mobile device 402 performs echo cancellation so that speech 412 from the user 414 is transmitted to the remote device but the modified audio content played back by the speaker 406 is not transmitted to the remote device.

Figure 5:
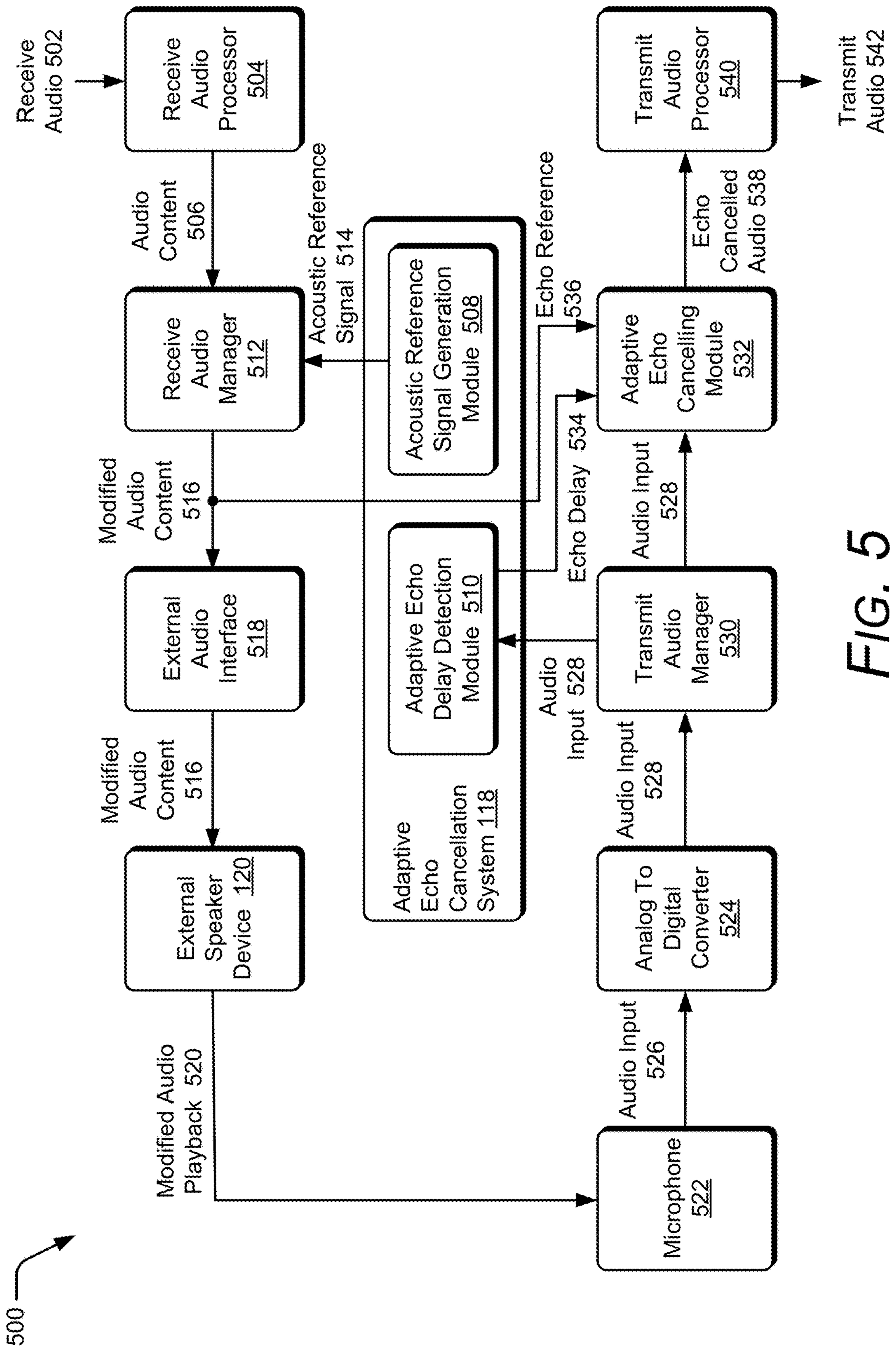
FIG. 5 illustrates an example system implementing the techniques discussed herein.

FIG. 5 illustrates an example system 500 implementing the techniques discussed herein. The system 500 is implemented in part, for example, by the mobile device 102 of FIG. 1 or the mobile device 202 of FIG. 2. In the system 500, receive audio 502 is input to a receive audio processor 504. The receive audio 502 is received from another device, such as a remote device that the mobile device 102 is in a video or voice call.

The receive audio processor 504 changes the characteristics of the receive audio 502 and outputs the changed receive audio 502 as audio content 506. These changes are to, for example, enhance or suppress various features of the receive audio 502. Any of a variety of public or proprietary techniques or algorithms can be used by the receive audio processor 504 to change the characteristics of the receive audio 502. For example, the receive audio processor 504 may alter the gain of the receive audio 502, apply an infinite impulse response (IIR) filter to the receive audio 502, perform multiband dynamic range compression on the receive audio 502, and so forth.

The system 500 includes an acoustic reference signal generation module 508 and an adaptive echo delay detection module 510. The acoustic reference signal generation module 508 generates and provides to a receive audio manager 512 an acoustic reference signal 514. The receive audio manager 512 also receives the audio content 506 from the receive audio processor 504. The receive audio manager 512 generates modified audio content 516 by adding the acoustic reference signal 514 to the audio content 506.

The acoustic reference signal 514 is an out-of-band acoustic reference signal that is in a frequency range typically not audible to humans. In one or more implementations, the acoustic reference signal 514 is an ultrasonic signal, such as being in the 20-40 kilohertz (kHz) range or the 22-27 kHz range. The acoustic reference signal 514 can take any of various forms, such as a Schrödinger wavelet, a discrete frequency, broad-band signal (a chirp), a pulse, a shaped noise, and so forth.

Figure 6:
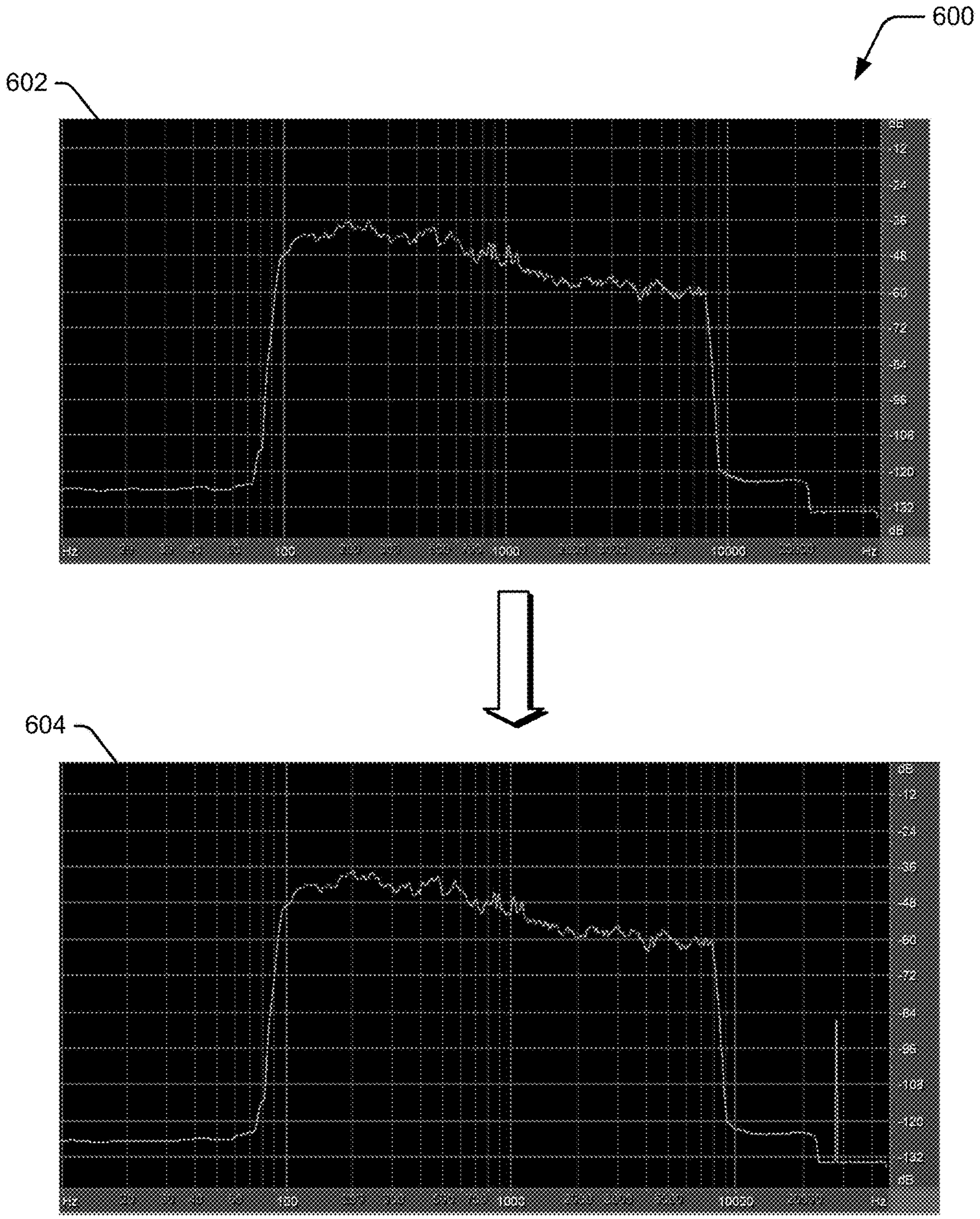
FIG. 6 illustrates an example of adding an acoustic reference signal to audio content.

FIG. 6 illustrates an example 600 of adding an acoustic reference signal to audio content. In the example 600, audio content that is speech at a particular point in time is illustrated at 602. The audio content ranges from approximately 100 hertz (Hz) to 8 kHz. Adding an acoustic reference signal to the audio content at the particular point in time is illustrated at 604, resulting in modified audio content. The acoustic reference signal is a discrete frequency (approximately 29 kHz). Although illustrated as a discrete frequency in example 600, additionally or alternatively the acoustic reference signal can take other forms as discussed above.

Figure 7:
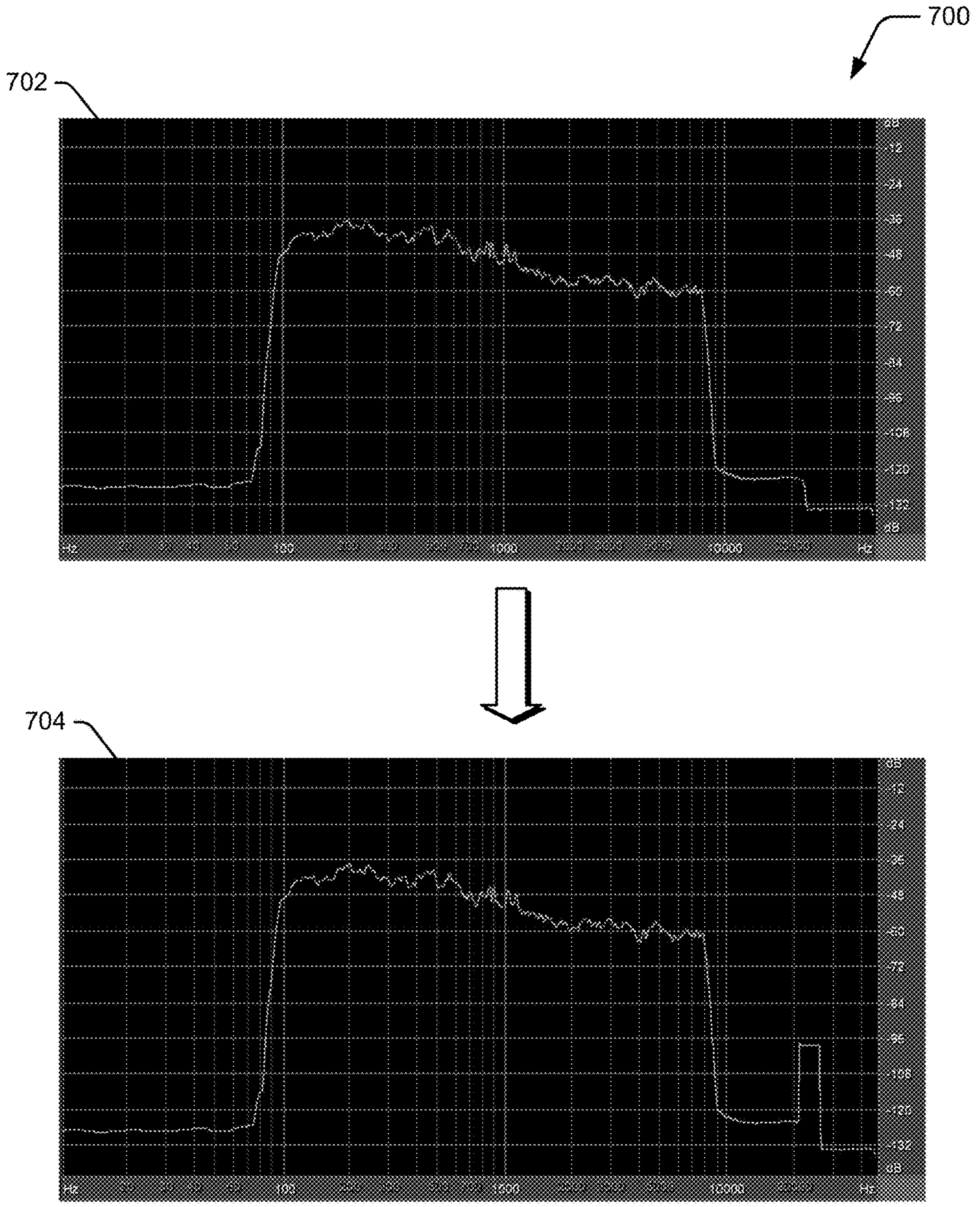
FIG. 7 illustrates another example of adding an acoustic reference signal to audio content.

FIG. 7 illustrates another example 700 of adding an acoustic reference signal to audio content. In the example 700, audio content that is speech at a particular point in time is illustrated at 702. The audio content ranges from approximately 100 hertz (Hz) to 8 kHz. Adding an acoustic reference signal to the audio content at the particular point in time is illustrated at 704, resulting in modified audio content. The acoustic reference signal is a signal having a broader frequency range (e.g., a chirp rather than the tone of example 600), ranging in frequency from approximately 21 kHz to approximately 26 kHz. Although illustrated as a broader frequency range in example 700, additionally or alternatively the acoustic reference signal can take other forms as discussed above.

Returning to FIG. 5, the receive audio manager 512 adds the acoustic reference signal 514 to the audio content 506 at regular or irregular intervals. For example, the receive audio manager 512 adds the acoustic reference signal 514 to the audio content 506 approximately every 1 second or approximately every 0.5 seconds. In one or more implementations, the receive audio manager 512 adds the acoustic reference signal 514 to the audio content 506 whenever audio content 506 is received from the receive audio processor 504. For example, in a mobile device 102, the receive audio manager 512 can add the acoustic reference signal 514 to the audio content 506 for the duration of a video call or a conference call that the mobile device 102 is engaged in.

The modified audio content 516 is provided to an external audio interface 518, which transmits the modified audio content 516 to an external speaker device 120. The external audio interface 518 can transmit the modified audio content 516 to the external speaker device 120 using any of a variety of wired or wireless connections as discussed above. The external speaker device 120 outputs the modified audio content 516 as modified audio playback 520.

A microphone 522 receives (e.g., picks up or senses), and provides to an analog to digital converter 524, audio input 526. The audio input received by the microphone 522 includes the modified audio playback 520 as well as any other audio (e.g., a user's speech) received by the microphone 522. The microphone 522 (e.g., a microphone 106 of FIG. 1) can be any of a variety of different types of microphones as discussed above.

The analog to digital converter 524 converts the audio input 526 to digital form, outputting the digital audio input 528 to a transmit audio manager 530. The transmit audio manager 530 provides the digital audio input 528 to the adaptive echo delay detection module 510 and to an adaptive echo cancelling module 532. In one or more implementations, the adaptive echo delay detection module 510, the acoustic reference signal generation module 508, and the adaptive echo cancelling module 532 are part of the adaptive echo cancellation system 118 of FIG. 1.

The adaptive echo delay detection module 510 identifies the out-of-band acoustic reference signal in the digital audio input 528 received at a particular time (e.g., time to). The adaptive echo delay detection module 510 also knows the timing of when the acoustic reference signal 514 was added to the audio content 506 (e.g., time $t_d$). The adaptive echo delay detection module 510 readily determines as the echo delay the difference between these two times (e.g., echo delay=$t_d$-$t_0$). The adaptive echo delay detection module 510 outputs the determined echo delay as echo delay 534.

In one or more implementations, the adaptive echo cancelling module 532 also uses the echo delay 534 to determine an echo tail length, which refers to the beginning (or ending) of a window during which the adaptive echo cancelling module 532 can effectively cancel echo. Given the echo delay 534, the adaptive echo cancelling module 532 knows approximately where to expect the echo in the digital audio input 528 and can set the window accordingly. This allows the system 500 to conserve resources (e.g., power and memory) that might otherwise be expended in order to have a longer echo tail length to accommodate the unknown distance between the microphone 522 and the external speaker device 120.

In one or more implementations, each acoustic reference signal 514 added to audio content 506 is the same. Accordingly, over a span of time (e.g., a few minutes), the same acoustic reference signal 514 will be added to the audio content 506 at different times. Additionally or alternatively, different acoustic reference signals 514 can be added to the audio content 506 at different times. For example, the acoustic reference signals 514 at different times can be different discrete frequencies, the acoustic reference signals 514 at different times can be Schrödinger wavelets with different frequency ranges, and so forth.

Using different acoustic reference signals 514 at different times allows the echo delay to be determined accurately if the echo delay is longer than the time between adding the acoustic reference signals 514 to the audio content 506. For example, assume the echo delay is 2.5 seconds (e.g., due in part to delays within the external speaker device 120) and acoustic reference signals 514 are added to the audio content 506 at approximately one second intervals. Further assume that the acoustic reference signal generation module 508 cycles through three different Schrödinger wavelet frequency ranges as acoustic reference signals 514. E.g., frequency range A for the first acoustic reference signal 514 at time ($t_0$) frequency range B for the next acoustic reference signal 514 at time ($t_0$+1 second), frequency range C for the next acoustic reference signal 514 at time ($t_0$+2 seconds), frequency range D for the next acoustic reference signal 514 at time ($t_0$+3 seconds), and so forth. If the adaptive echo delay detection module 510 detects an acoustic reference signal that is a Schrödinger wavelet in frequency range A in the digital audio input 528 at time ($t_0$+2.5 seconds), the adaptive echo delay detection module 510 knows that the acoustic reference signal corresponds to the acoustic reference signal added at time ($t_0$) rather than some other acoustic reference signal (e.g., rather than the most recently added acoustic reference signal).

In one or more implementations, the adaptive echo cancelling module 532 is configured with a default echo delay 534 or the adaptive echo delay detection module 510 is configured to provide a default echo delay 534 to the adaptive echo cancelling module 532. The adaptive echo cancelling module 532 uses the default echo delay 534 until the first out-of-band acoustic reference signal is detected in the digital audio input 528. This default echo delay 534 can be determined in any of a variety of different manners, such as based on a maximum distance (or minimum distance, or average distance) between the external speaker device 120 and the microphone 522. Additionally or alternatively, the default echo delay 534 is based on an expected typical distance between the external speaker device 120 and the microphone 522. Additionally or alternatively, the default echo delay 534 is a last-determined echo delay 534 (e.g., which may be stored and maintained across device restarts or resets).

The adaptive echo cancelling module 532 receives the transmit audio manager 530 as well as an echo reference 536. Given the echo reference 536 and the echo delay 534, the adaptive echo cancelling module 532 can readily cancel echo in the digital audio input 528 resulting from the microphone 522 receiving the modified audio playback 520. Generally, the adaptive echo cancelling module 532 uses the modified audio content 516 as an estimate of the echo in the modified audio playback 520 received by the microphone 522 and subtracts that estimate from the digital audio input 528. The adaptive echo cancelling module 532 uses an adaptive filter to generate a signal accurate enough to effectively cancel the echo, where the echo in the modified audio playback 520 can differ from the original in the modified audio content 516 due to various kinds of degradation along the way. The adaptive echo cancelling module 532 uses any of a variety of public or proprietary techniques to cancel the echo from the digital audio input 528 and generate echo cancelled audio 538.

A transmit audio processor 540 receives the echo cancelled audio 538 and changes the characteristics of the cancelled audio 538 prior to transmitting the changed audio as transmit audio 542.

These changes are to, for example, enhance or suppress various features of the receive audio echo cancelled audio 538. Any of a variety of public or proprietary techniques or algorithms can be used by the transmit audio processor 540 to change the characteristics of the echo cancelled audio 538. For example, the transmit audio processor 540 may alter the gain of the echo cancelled audio 538, apply an IIR filter to the echo cancelled audio 538, perform multiband dynamic range compression on the echo cancelled audio 538, and so forth.

The transmit audio processor 540 transmits the changed audio as transmit audio 542 to another device, such as a remote device that the mobile device 102 is in a video or voice call. The remote device is, for example, the device from which the receive audio 502 was received.

Figure 8:
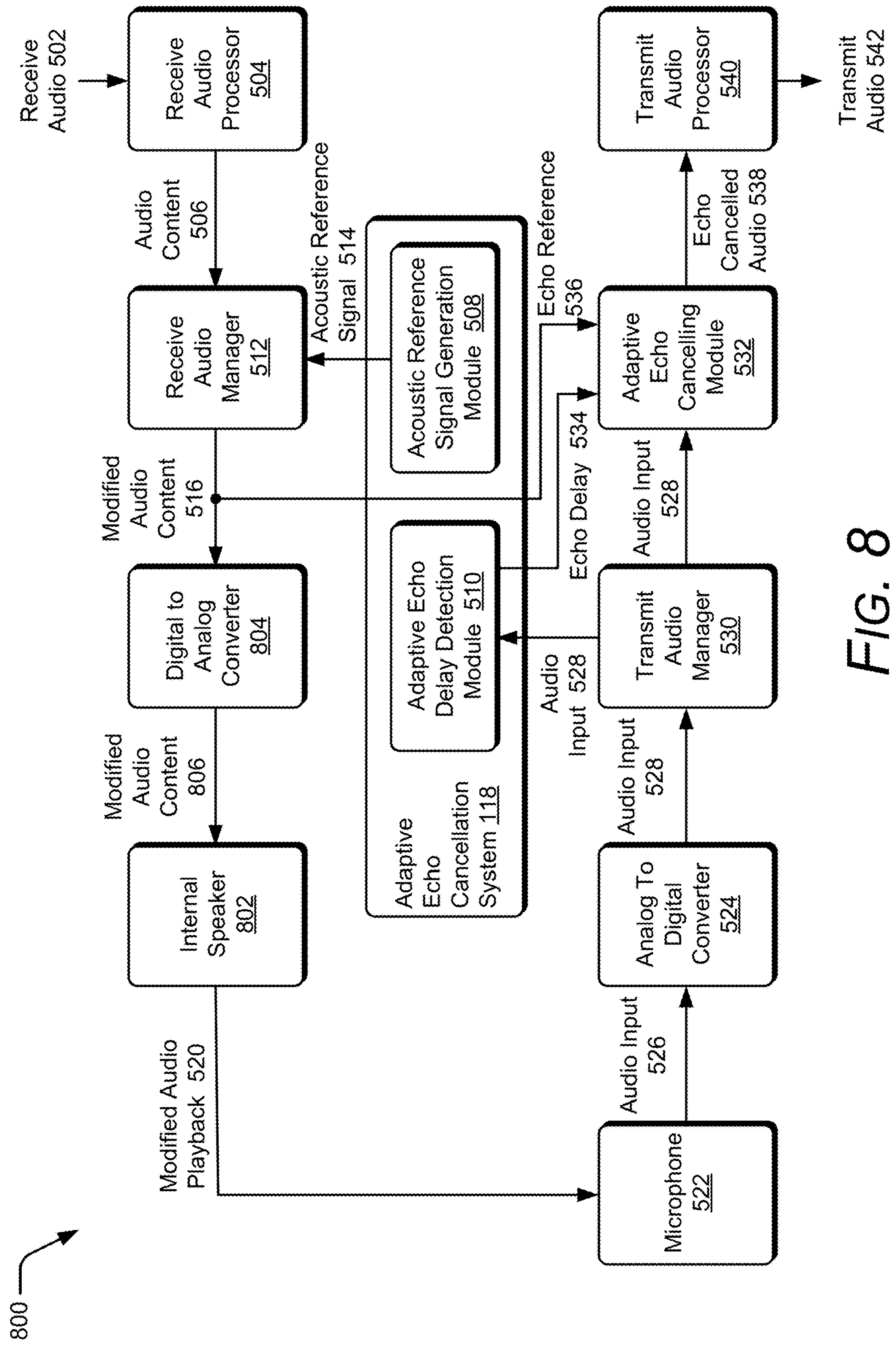
FIG. 8 illustrates an example system implementing the techniques discussed herein.

FIG. 8 illustrates an example system 800 implementing the techniques discussed herein. The system 800 is implemented in part, for example, by the mobile device 102 of FIG. 1 or the mobile device 302 of FIG. 3. The system 800 is similar to the system 500 of FIG. 5, and includes the receive audio processor 504, the receive audio manager 512, the microphone 522, the analog to digital converter 524, the transmit audio manager 530, the adaptive echo cancelling module 532, and the transmit audio processor 540. However, the system 800 differs from the system 500 of FIG. 5 in that the system 800 uses an internal speaker 802 (which is also a speaker device) to output the modified audio playback 520 rather than an external speaker device.

In the system 800, the modified audio content 516 is provided to a digital to analog converter 804, which converts the modified audio content 516 to analog form, outputting analog modified audio content 806 to the internal speaker 802. The internal speaker 802 outputs the analog modified audio content 806 as modified audio playback 520.

Similar to the discussion above regarding the system 500 of FIG. 5, in one or more implementations, the adaptive echo cancelling module 532 is configured with a default echo delay 534 or the adaptive echo delay detection module 510 is configured to provide a default echo delay 534 to the adaptive echo cancelling module 532. The adaptive echo cancelling module 532 uses the default echo delay 534 until the first out-of-band acoustic reference signal is detected in the digital audio input 528. This default echo delay 534 can be determined in any of a variety of different manners, such as based on a maximum distance (or minimum distance, or average distance) between the internal speaker 802 and the microphone 522. Additionally or alternatively, the default echo delay 534 is based on an expected typical distance between the external speaker device 120 and the microphone 522. Additionally or alternatively, the default echo delay 534 is a last-determined echo delay 534 (e.g., which may be stored and maintained across device restarts or resets).

Figure 9:
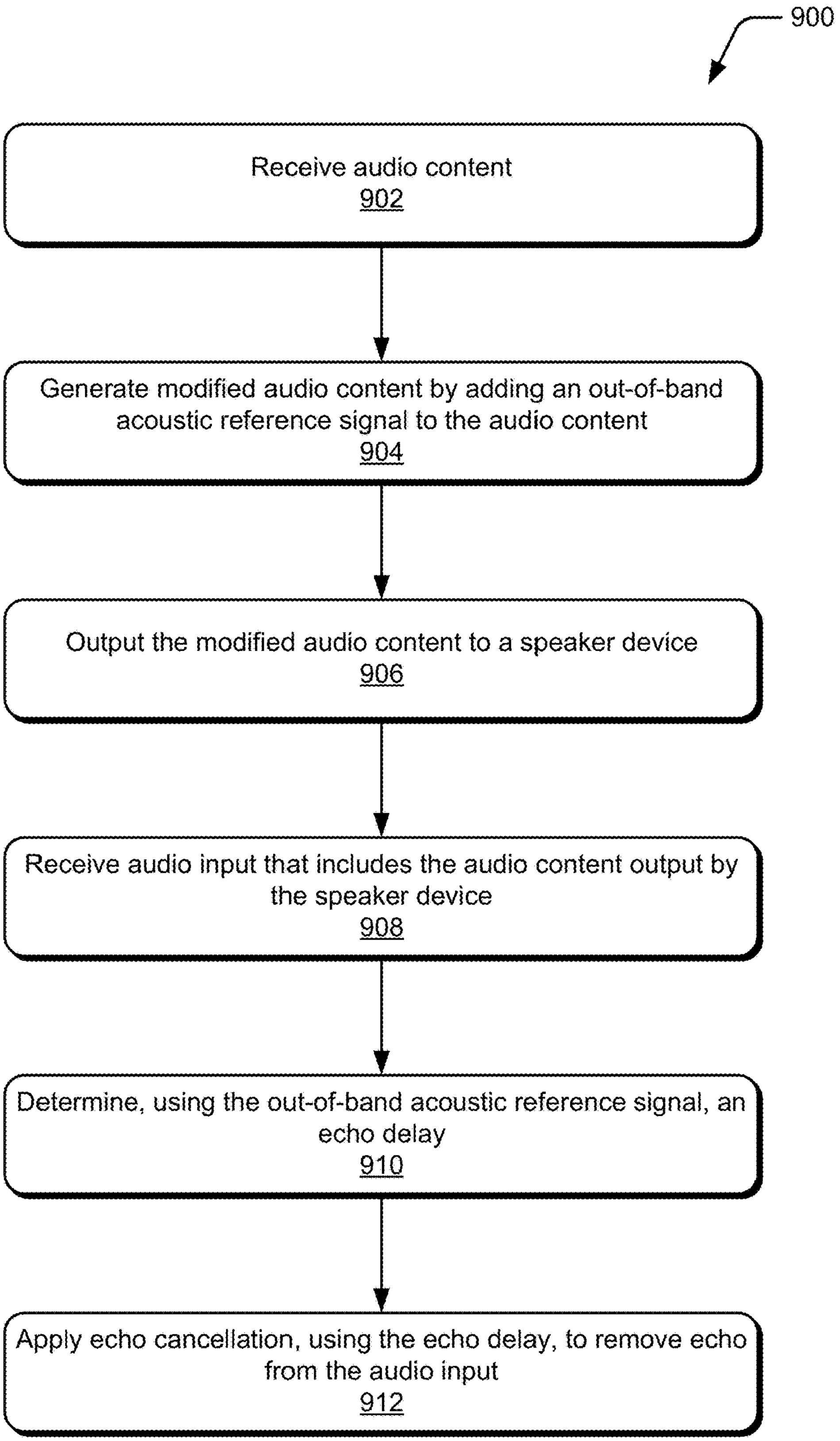
FIG. 9 illustrates an example process for implementing the techniques discussed herein in accordance with one or more embodiments.

FIG. 9 illustrates an example process 900 for implementing the techniques discussed herein in accordance with one or more embodiments. Process 900 is carried out by a device, such as mobile device 102 of FIG. 1, mobile device 202 of FIG. 2, or mobile device 302 of FIG. 3, and can be implemented in software, firmware, hardware, or combinations thereof. Process 900 is shown as a set of acts and is not limited to the order shown for performing the operations of the various acts.

In process 900, audio content is received (act 902). The audio content is received, for example, from a remote device as part of a video call or a voice call.

Modified audio content is generated by adding an out-of-band acoustic reference signal to the audio content (act 904). The out-of-band acoustic reference signal is, for example, an ultrasonic signal.

The modified audio content is output to a speaker device (act 906). This output to a speaker device can take various forms, such as transmission to an external speaker device (external to the mobile device), communication to an internal speaker (part of the mobile device), and so forth.

Audio input that includes the audio content output by the speaker device is received (act 908). The speaker device outputs the audio content by playing back the audio content, which is received by a microphone (e.g., of the mobile device) optionally along with other audio (e.g., speech of a user of the mobile device).

An echo delay is determined using the out-of-band acoustic reference signal (act 910).

Echo cancellation is applied, using the echo delay, to remove echo from the audio input (act 912).

Figure 10:
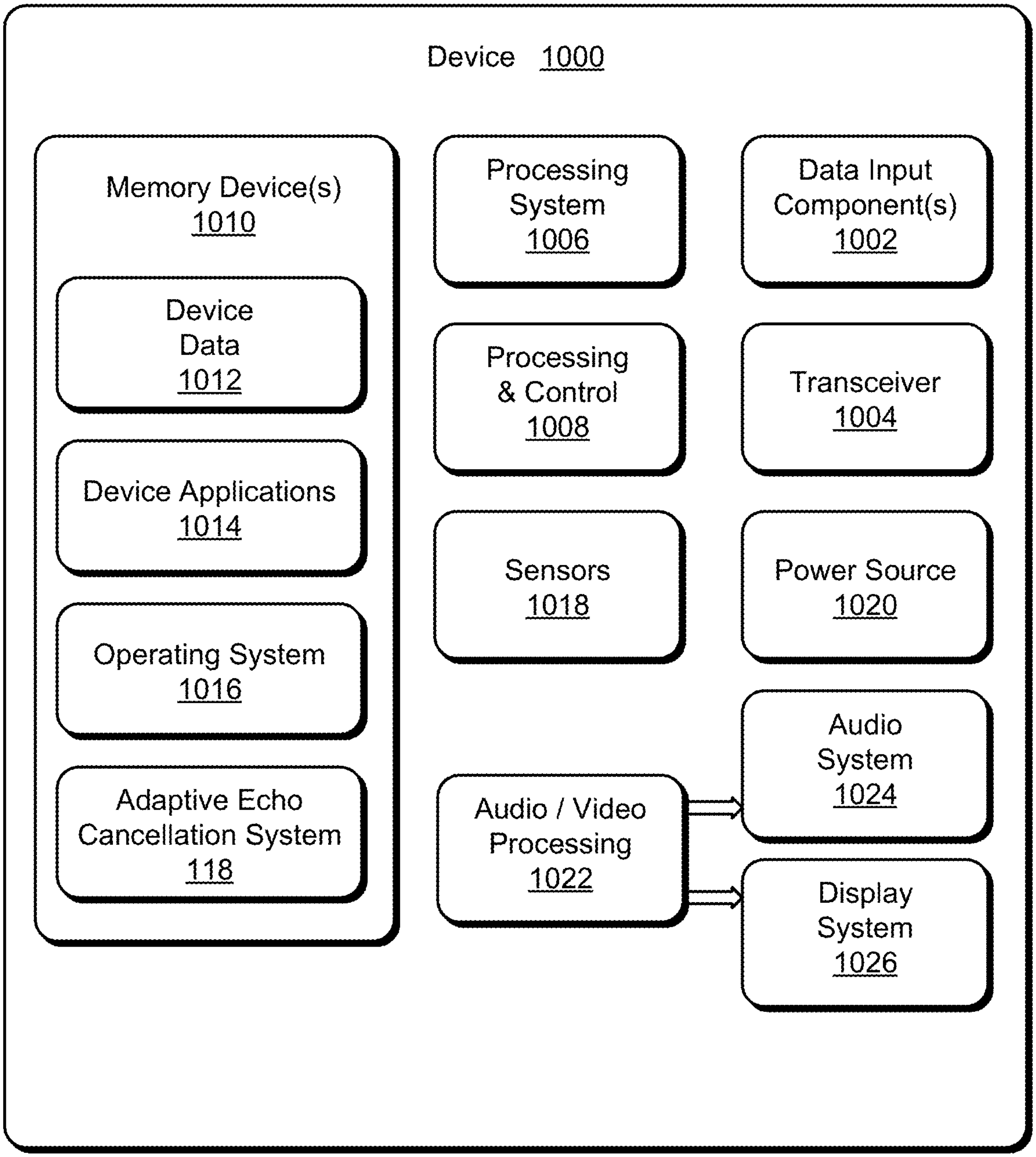
FIG. 10 illustrates various components of an example electronic device that can implement embodiments of the techniques discussed herein.

FIG. 10 illustrates various components of an example electronic device that can implement embodiments of the techniques discussed herein. The electronic device 1000 can be implemented as any of the devices described with reference to the previous FIG.s, such as any type of client device, mobile phone, tablet, computing, communication, entertainment, gaming, media playback, or other type of electronic device. In one or more embodiments the electronic device 1000 includes the adaptive echo cancellation system 118, described above.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable data storage, such as data storage devices that can be accessed by a mobile device, and that provide persistent storage of data and executable instructions (e.g., software applications, programs, functions, and the like). Examples of the computer-readable storage memory devices 1010 include volatile memory and non-volatile memory, fixed and removable media devices, and any suitable memory device or electronic data storage that maintains data for mobile device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, accelerometer, gyroscope, thermal sensor, audio sensor (e.g., microphone), and the like. The device 1000 can also include one or more power sources 1020, such as when the device 1000 is implemented as a mobile device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for adaptive echo delay determination using an out-of-band acoustic reference signal have been described in language specific to features or methods, the subject of the appended claims is not necessarily limited to the specific features or methods described. Rather, the specific features and methods are disclosed as example implementations of techniques for implementing adaptive echo delay determination using an out-of-band acoustic reference signal. Further, various different embodiments are described, and it is to be appreciated that each described embodiment can be implemented independently or in connection with one or more other described embodiments. Additional aspects of the techniques, features, and/or methods discussed herein relate to one or more of the following.

In some aspects, the techniques described herein relate to a method including: receiving an audio content; generating modified audio content by adding an out-of-band acoustic reference signal to the audio content; outputting the modified audio content to a speaker device; receiving audio input that includes the audio content output by the speaker device; determining, using the out-of-band acoustic reference signal, an echo delay; and applying echo cancellation, using the echo delay, to remove an echo from the audio input.

In some aspects, the techniques described herein relate to a method, wherein the echo includes the modified audio content played back by the speaker device and received as part of the audio input.

In some aspects, the techniques described herein relate to a method, wherein the out-of-band acoustic reference signal is added to the audio content at approximately regular intervals.

In some aspects, the techniques described herein relate to a method, wherein the audio content is received as part of a voice or video call, and the out-of-band acoustic reference signal is added to the audio content at approximately regular intervals for a duration of the voice or video call.

In some aspects, the techniques described herein relate to a method, wherein the approximately regular intervals include approximately every one second.

In some aspects, the techniques described herein relate to a method, wherein the out-of-band acoustic reference signal is an ultrasonic signal.

In some aspects, the techniques described herein relate to a method, wherein the out-of-band acoustic reference signal includes a Schrödinger wavelet.

In some aspects, the techniques described herein relate to a method comprising using, as the echo delay, a default echo delay until audio input that includes the out-of-band acoustic reference signal is received.

In some aspects, the techniques described herein relate to a method, wherein the echo delay is a last-determined echo delay for the echo cancellation.

In some aspects, the techniques described herein relate to a mobile device including: a microphone; an audio output component; an adaptive echo cancelling module; and an adaptive echo delay detection module using an out-of-band acoustic reference signal to determine an echo delay input to the adaptive echo cancelling module to remove, from audio input detected by the microphone, echo resulting from an unknown distance between the microphone and audio output from the audio output component.

In some aspects, the techniques described herein relate to a mobile device, wherein the audio output component includes an external audio interface that transmits audio content to an external speaker device.

In some aspects, the techniques described herein relate to a mobile device, wherein the mobile device includes a foldable device including a first part and a second part connected to one another by a mechanism that moves the first part and second part towards one another or away from one another, the first part includes the microphone, and the second part includes a speaker.

In some aspects, the techniques described herein relate to a mobile device, wherein the mobile device comprises a slide device including a first part and a second part connected to one another by a mechanism that moves the first part and second part towards one another or away from one another in a sliding manner, the first part includes the microphone, and the second part includes a speaker.

In some aspects, the techniques described herein relate to a mobile device, wherein the out-of-band acoustic reference signal is included as part of the audio output from the audio output component.

In some aspects, the techniques described herein relate to a mobile device, wherein the out-of-band acoustic reference signal is added to audio content output by the audio output component at approximately regular intervals.

In some aspects, the techniques described herein relate to a mobile device, wherein the out-of-band acoustic reference signal is an ultrasonic signal.

In some aspects, the techniques described herein relate to a mobile device, wherein the out-of-band acoustic reference signal includes a Schrödinger wavelet.

In some aspects, the techniques described herein relate to a mobile device, wherein the out-of-band acoustic reference signal comprises a shaped noise.

In some aspects, the techniques described herein relate to a mobile device including: a processor implemented in hardware; and a computer-readable storage medium having stored thereon multiple instructions that, responsive to execution by the processor, cause the processor to perform acts including: receiving an audio content; generating modified audio content by adding an out-of-band acoustic reference signal to the audio content; outputting the modified audio content to a speaker device; receiving audio input that includes the audio content output by the speaker device; determining, using the out-of-band acoustic reference signal, an echo delay; and applying echo cancellation, using the echo delay, to remove an echo from the audio input.

In some aspects, the techniques described herein relate to a mobile device, the out-of-band acoustic reference signal comprising an ultrasonic signal and the adding comprising adding the ultrasonic signal to the audio content at approximately regular intervals.

What is claimed is:

1. A method comprising:

receiving an audio content from a remote device that is foldable and includes a first part and a second part connected to one another by a mechanism that moves the first part and the second part towards one another or away from one another, the first part including a microphone, and the second part including a speaker device;

generating modified audio content by adding an out-of-band acoustic reference signal to the audio content;

outputting the modified audio content to the speaker device;

receiving, via the microphone, audio input that includes the modified audio content output by the speaker device;

determining, using the out-of-band acoustic reference signal, an echo delay based on a time delay between a time when the out-of-band acoustic reference signal was added to the audio content and a time when the audio input including the out-of-band acoustic reference signal was received from the speaker device;

applying echo cancellation, using the echo delay, to generate changed audio input by removing from the audio input an echo introduced by the audio content; and transmitting the changed audio input to the remote device.

2. The method of claim 1, wherein the echo comprises the modified audio content played back by the speaker device and received as part of the audio input.

3. The method of claim 1, wherein the out-of-band acoustic reference signal is added to the audio content at approximately regular intervals.

4. The method of claim 3, wherein the audio content is part of a voice or video call, and the out-of-band acoustic reference signal is added to the audio content at approximately regular intervals for a duration of the voice or video call.

5. The method of claim 3, wherein the approximately regular intervals comprise approximately every one second.

6. The method of claim 1, wherein the out-of-band acoustic reference signal is an ultrasonic signal.

7. The method of claim 1, wherein the out-of-band acoustic reference signal comprises a Schrödinger wavelet.

8. The method of claim 1, further comprising using, as the echo delay, a default echo delay until the audio input that includes the out-of-band acoustic reference signal is received.

9. The method of claim 8, wherein the echo delay is a last-determined echo delay for the echo cancellation.

10. The method of claim 1, further comprising determining an echo tail length corresponding to a time window for the echo cancellation based on the echo delay.

11. A mobile device comprising:

a microphone included at a first part of the mobile device, the first part connected to a second part of the mobile device by a mechanism that moves the first part and the second part towards one another or away from one another in a sliding manner;

an audio output component included at the second part of the mobile device to output audio content received from a remote device and modified to include an out-of-band acoustic reference signal;

an adaptive echo cancelling module;

an adaptive echo delay detection module using the out-of-band acoustic reference signal to determine an echo delay input to the adaptive echo cancelling module to remove, from audio input detected by the microphone that includes the audio content, an echo resulting from an unknown distance between the microphone and an audio output from the audio output component, based on a time delay between a time when the out-of-band acoustic reference signal was added to the audio content and a time when the audio input including the out-of-band acoustic reference signal was received from the audio output component; and an audio processor to transmit the audio input to the remote device after removal of the echo.

12. The mobile device of claim 11, wherein the audio output component comprises an external audio interface that transmits the audio content to an external speaker device.

13. The mobile device of claim 11, wherein the out-of-band acoustic reference signal is included as part of the audio output from the audio output component.

14. The mobile device of claim 13, wherein the out-of-band acoustic reference signal is added to audio content output by the audio output component at approximately regular intervals.

15. The mobile device of claim 11, wherein the out-of-band acoustic reference signal is an ultrasonic signal.

16. The mobile device of claim 11, wherein the out-of-band acoustic reference signal comprises a shaped noise.

17. The mobile device of claim 11, wherein the echo includes modified audio content played back by a speaker device and received as part of the audio input.

18. A mobile device comprising:

a processor implemented in hardware; and a computer-readable storage medium having stored thereon multiple instructions that, responsive to execution by the processor, cause the processor to perform acts including:

receiving an audio content from a remote device at a first time;

generating modified audio content by adding a first out-of-band acoustic reference signal to the audio content;

outputting the modified audio content to a speaker device;

receiving, via a microphone, audio input that includes the modified audio content output by the speaker device;

determining, using the first out-of-band acoustic reference signal, an echo delay based on a time delay between a time when the first out-of-band acoustic reference signal was added to the audio content and a time when the audio input including the first out-of-band acoustic reference signal was received from the speaker device;

applying echo cancellation, using the echo delay, to generate changed audio input by removing from the audio input an echo introduced by the audio content;

receiving additional audio content from the remote device at a second time that is after the first time;

generating additional changed audio input by adding a second out-of-band acoustic reference signal to the additional audio content, the second out-of-band acoustic reference signal being different from the first out-of-band acoustic reference signal; and transmitting the additional changed audio input to the remote device.

19. The mobile device of claim 18, wherein the first out-of-band acoustic reference signal is an ultrasonic signal.

20. The mobile device of claim 18, wherein the echo includes the modified audio content played back by the speaker device and received as part of the audio input.

* * * * *